United States Patent
Dunn (10) Patent No.: US 6,963,599 B1
(45) Date of Patent: *Nov. 8, 2005

(54) MULTITONE FREQUENCY HOP COMMUNICATIONS SYSTEM

(75) Inventor: James G. Dunn, San Diego, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1826 days.

This patent is subject to a terminal disclaimer.

(21) Appl. No.: 07/998,824

(22) Filed: Dec. 30, 1992

(51) Int. Cl.[7] .............................. H04B 1/69; H04B 1/713
(52) U.S. Cl. ........................ 375/132; 375/130; 375/135; 375/136
(58) Field of Search .............................. 375/1, 130–153; 380/34

(56) References Cited

U.S. PATENT DOCUMENTS

| | | | | |
|---|---|---|---|---|
| 4,222,115 A | * | 9/1980 | Cooper et al. | 375/1 |
| 5,166,953 A | * | 11/1992 | Hershey et al. | 375/1 |
| 5,173,923 A | * | 12/1992 | Crespo et al. | 375/1 |
| 5,210,770 A | * | 5/1993 | Rice | 375/1 |
| 5,267,271 A | * | 11/1993 | Rice | 375/1 |

FOREIGN PATENT DOCUMENTS

| | | | |
|---|---|---|---|
| GB | 2252017 A | * | 7/1992 |
| JP | 0120735 | * | 6/1987 |

* cited by examiner

Primary Examiner—Bernarr E. Gregory

(57) ABSTRACT

An improved spread spectrum communications system is disclosed in which M-ary symbols are defined corresponding to each state of digital data to be transmitted and in which each of those M-ary symbols are represented by a plurality of tones selected from a set of N frequencies. A different plurality of tones out of the set N is established to represent each of the M-ary symbols during each successive timing interval, with selection of the tones comprising each such plurality of tones being determined in accordance with a known coding pattern. Phasing of the tones comprising each such plurality is also determined in accordance with a known coding sequence. After selection of the symbol corresponding to the data to be transmitted during a given timing interval, the frequency domain representation of the plurality of tones corresponding to that symbol is converted to the time domain for transmission. That time domain signal is converted back to the frequency domain by the receiver and the resultant signal processed by M-ary signal correlators synchronized with coding established by the transmitter to determine the transmitted symbol.

33 Claims, 5 Drawing Sheets

Multitone FH System - Rectangular Window

MULTITONE FREQUENCY HOP COMMUNICATIONS SYSTEM

FIELD OF THE INVENTION

This invention relates to broad-band communications systems in general, and more particularly to such a system where security of the transmitted intelligence is enhanced and the likelihood of interference at the selected receiver from other transmitters using the same frequency spectrum is materially decreased.

BACKGROUND OF THE INVENTION

Spread spectrum communications systems have been used in a variety of fields. In a communications system of this type, the transmitted bandwidth is much greater than the bandwidth or bit-rate of the information to be transmitted. Additionally, the carrier signal is modulated by some other function than the information being sent. At its essence, spread spectrum communications represents the art of expanding the bandwidth of a signal, transforming that expanded signal, and recovering the desired signal by remapping the received spread spectrum into the original information bandwidth. In general, the purpose of pursuing such a process of spreading information across a wide bandwidth, and the de-spreading of that information at the receiver, is to allow the system to deliver error-free information in a noisy signal environment.

Spread spectrum communications systems have many useful advantages: a selective call is possible since the power spectrum density is low, private communication is allowed, and they are relatively little influenced by interference either due to multipath fading or jamming. Based on these characteristics, spread spectrum systems have found many uses, such as mobile communications systems, avionics systems and satellite communications.

Spread spectrum communications systems can generally be categorized according to one of three types of modulation methods:

1) Modulation of a carrier by a digital code sequence whose bit rate is much higher than the information signal bandwidth. Such systems are called "direct sequence" modulated systems.
2) Carrier frequency shifting in discrete increments in a pattern dictated by a code sequence. Such systems are called "frequency hoppers".
3) Pulsed-FM or "chirp" modulation in which a carrier is swept over a wide band during a given pulse interval.

Of the three modulation techniques discussed, pulsed-FM is used primarily in a radar applications, while direct sequence modulation and frequency hopping are primarily used in communications systems.

Direct sequence modulation is the simpler of these to implement, with the basic operation being the modulation of the carrier by a code sequence—e.g., PN (pseudo-noise), M-sequence, Gold code and the like—where the code operates to spread the transmitted information across the bandwidth of the system. In a frequency hopping system, on the other hand, a carrier frequency is shifted, or jumped, in discrete increments, in a pattern dictated by a such a code-sequence, in synchronism with a change in the state of the codes. The resulting consecutive and time-sequential frequency pattern is called a hopping pattern.

In reproducing a spread-spectrum information signal at the receiver, a synchronization acquisition process is first performed, in which the code pattern provided in the receiver is made accurately coincident with the code pattern generated in the transmitter, in time position. Then, the spread spectrum signal is de-spread, and thereafter a well known demodulation is performed to extract the desired information. Such spread spectrum transmitting and receiving systems are described in detail in a text entitled *Spread Spectrum Systems*, by R. C. Dixon, second edition, 1984, published by John Wiley and Sons, Inc.

In Low Probability of Intercept (LPI) communications, which is of particular interest in the field of covert mobile radio communications, a primary object is the security of the communication's link—i.e., avoidance of detection of such communications by third parties which could, in turn, lead either to interception of the transmitted intelligence or interruption of the transmission path by jamming. Both direct sequence modulation and frequency hopping present unique, and largely conflicting, advantages and disadvantages for use in LPI communications.

With direct sequence modulation, because the transmitted energy is spread evenly over the entire bandwidth of a carrier frequency, the energy transmitted at any one frequency within that bandwidth is quite low and relatively unlikely to be detected. However, another characteristic of this modulation process is that of producing a constant amplitude across the entire bandwidth of the carrier signal, and therefore such a signal does not really mimic the noise-like (i.e., random amplitude) signal of low-level noise. Thus, while the direct sequence signal is relatively less likely to be detected, upon detection of such a signal, this constant amplitude characteristic generally presents a clear distinction from a "noise" signal. In addition, spreading of the transmitted information across the entire spectrum of the wide-band carrier creates a disadvantage where other "friendly" transmitters utilizing the same, or similar bandwidths are operating nearby—or, worse, operating at a distance from the intended receiver which is materially less than the distance between that receiver and the sending transmitter. In that circumstance, such an interfering transmitter disrupts the desired communications between the sending transmitter and the intended receiver.

A frequency hopping system, on the other hand, largely avoids the problem of interference from competing transmitters, because the probability of a particular instantaneous transmission frequency in the carrier signal spectrum being used simultaneously by two "competing" transmitters—where selection of such frequencies is established in the usual circumstance by a pseudo-random code—is quite low. The probability of interception, however, for a frequency hopping system is substantially greater than for a direct sequence system because all of the transmitted energy is concentrated in a single frequency at each instant in time. Thus, while the probability of interference from competing "friendly" transmissions is substantially reduced in a frequency hopping system, the likelihood of interception of that transmission by "unfriendly" third parties—and thus possibly decoding the intelligence transmitted and/or jamming the signal—is significantly greater.

At this stage of prior art development, an LPI communications system, where security was a paramount concern, would ordinarily have utilized a direct sequence system. However, as pointed out above, even with a direct sequence system, the constant amplitude waveform across the full spectrum of the carrier signal presented a material likelihood that the signal would be detected. In a 1991 paper entitled "Near Featureless Waveform Spread Spectrum LPI Communications", the authors, B. Storm and G. Zuelsdorf, describe an approach for a direct sequence system which achieves a noise-like waveform and therefore would be expected to significantly reduce the likelihood of detection for a direct sequence signal. Applicant notes that the authors are employees of the National Security Agency (or at least were at the time the paper was prepared) and that the paper has been classified "secret" by the agency. Applicant does not have sufficient information to determine whether the brief discussion of the subject matter of that paper presented herein as background for Applicant's invention constitutes classified matter.

The essential characteristic of the Storm and Zuelsdorf approach which is needed as background for Applicant's invention is their representation of the coded information as a frequency function which is transformed into the time domain prior to transmission of such information. More specifically, Storm and Zuelsdorf describe a system whereby the frequency band is divided into a large number of frequency channels and a tone is generated in each channel. By varying the phases of such tones, using a pseudo random code, and thereafter transforming those tones to the time domain, the resultant carrier signal is a noise-like waveform—i.e. its amplitude across the frequency spectrum is randomized. Implementation of such a system is accomplished by converting an input signal to the frequency domain using Fourier transforms, randomizing the phases of the resultant tones in accordance with the coding chosen, and then converting such phase-randomized tones back to the time domain for transmission. The receiver, of course, does the reverse operation.

While the Storm and Zuelsdorf approach produces a largely randomized amplitude for the carrier signal of a direct sequence system and should therefore materially reduce the detectability of such a spread spectrum communications signal, the interference problem associated with all direct sequence systems is not addressed—i.e., where an interfering transmitter near to a receiver which is listening to a desired transmitter relatively far away disrupts the desired communication.

SUMMARY OF THE INVENTION

Multitone frequency hop is an improved spread-spectrum communications approach which builds on both traditional frequency hopping systems and the featureless waveform system of Storm and Zuelsdorf to achieve a communications system which combines very low probability of interception with minimal interference between competing "friendly" transmitters. In the multitone frequency hop system $N_t$ tones out of N are assigned pseudo-randomly to define a data symbol. In addition, the tone phases are determined pseudo-randomly to give a noise-like transmitted waveform.

Multitone frequency hop begins with a frequency domain input signal generally analogous to that described by Storm and Zuelsdorf. However, rather than utilizing the entire spectrum of frequency tones available, as would occur in the Storm and Zuelsdorf direct sequence modulation, multitone frequency hop uses only a relatively small fraction of the available tones. For example, 64 tones out of a possible 1024 frequency channels may be sent simultaneously. As will be readily apparent, this reduces the number of collisions between desired and interfering tones hopping to the same frequency at the same time to a tolerable level.

Multitone frequency hop also generates a low probability of intercept signal because of the relatively large number of tones with pseudo-randomized phases which are sent for each increment of information transmitted. As already explained, ordinary frequency hopping, with only one tone sent at a time is relatively easy to intercept because all the transmitted energy is concentrated in one frequency channel. In contrast, multitone frequency hop reduces the density of the transmitted signal power by the number of tones used for a particular instantaneous transmission. For example, the use of 64 tones—i.e., with the transmitted energy spread over such 64 frequencies—reduces the spectrum density of the transmitted signal by 18 db compared with ordinary frequency hopping.

Accordingly a system and method of transmitting information using spread spectrum communications technology is presented wherein the coding of digital information to be transmitted and baseband modulation thereof is accomplished by:

establishment, during a given timing interval, of a plurality of subsets of tones to represent each possible state of the digitized information to be transmitted, the tones comprising each such subset being selected from a set of N frequencies;

during each successive timing interval, establishing a new plurality of subsets of tones drawn from the set N, such subsets representing each possible state of the digitized information, wherein selection of the tones comprising each such subset of tones is established based on a known coding sequence;

selecting the subset of tones corresponding to an increment of the digitized information to be transmitted during a timing interval and causing a frequency domain representation of that corresponding subset of tones to be operated on by an inverse finite Fourier transform thereby producing a time domain representation of that corresponding subset of tones which then modulates the carrier frequency of the transmission apparatus;

and operating on the received signal by a finite Fourier transform thereby reproducing a frequency domain representation of that corresponding subset of tones to be thereafter demodulated and decoded to replicate the transmitted information.

DETAILED DESCRIPTION OF INVENTION

Figures 1, 1A:
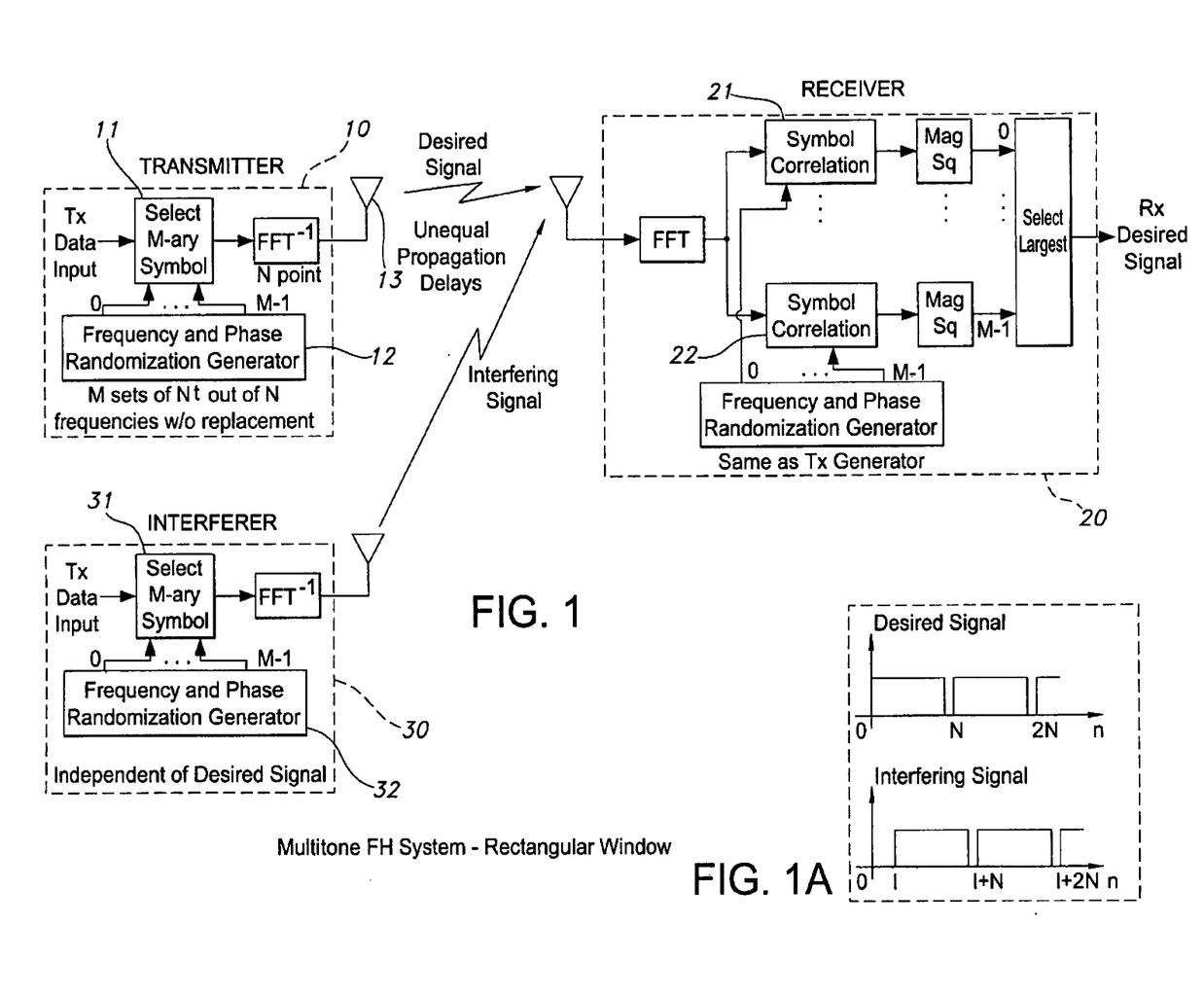
FIG. 1 is a basic block diagram of a communications system utilizing multitone frequency hop and using a rectangular window approach in the receiving unit.
FIG. 1A is a timing diagram illustrating a timing offset between a desired and an interfering signal.

FIG. 1 shows an embodiment of the multitone frequency hop system in which a receiver 20 receives both a desired signal from transmitter 10 and an interfering signal from transmitter 30, both transmitters being of the same type but with different waveform randomizations. Transmitter 10 sends a sequence of M-ary data symbols corresponding to digitized input data where each symbol represents one of the M possible states of the input data. At each successive timing interval for the transmitter, as determined by well-known timing methodologies, the data symbol to be transmitted (and corresponding to the increment of digitized input data to be transmitted during that timing interval) is selected by selector 11. Each of the M-ary data symbols is coded during a given timing interval by selecting $N_t$ tones out of a set of N available tones. The frequencies of the $N_t$ tones representing each of the M-ary data symbols are pseudo-randomly chosen by frequency and phase randomization generator 12 for each successively transmitted symbol.

In order to create a noise-like transmission waveform, frequency and phase randomization generator 12 also establishes a pseudo-random phasing for the $N_t$ tones, which randomization changes with each successively transmitted symbol. The noise-like symbol waveform is generated by summing the $N_t$ tones representing the transmitted data symbol, all such $N_t$ tones having the same amplitude and pseudo-random phases, and the remaining $N-N_t$ samples having 0 amplitude, to produce a transmitted waveform of N samples. In a preferred embodiment of the system, M=4 and N=1024.

The choice of $N_t$—i.e. the number of tones used to represent a data symbol—represents somewhat of a tradeoff between security and the likelihood of interference from a competing transmitter. It is desirable that $N_t$ be large to obtain a large process gain, sometimes called jamming margin. That is, the power density of each tone is reduced by the factor $N_t$ relative to a single tone frequency hop system. At the same time, it is desirable to make $N_t$ a small fraction of N to reduce the number of collisions between the desired and interfering signal. A collision is when a frequency channel occupied by the desired signal for a given symbol is also occupied by an overlapping (in time) symbol from an interfering signal. Values of $N_t$ of 8 and 64 have been implemented and the relative performance thereof plotted in FIG. 4. However, it should be understood that these are only example embodiments of the system and that any value of $N_t$ between 1 and N may be used subject to the described tradeoff between process gain and interference avoidance.

Selector 31 and frequency and phase randomization generator 32 of interfering transmitter 30 perform comparable functions to those described for selector 11 and frequency and phase randomization generator 12, but the output of interfering transmitter 30 would represent different waveform randomization than the output from transmitter 10.

Receiver 20 requires the same pseudo-randomization as used at transmitter 10, and must replicate that pseudo-randomization for all possible M-ary symbols. Thus, frequency and phase randomization generator 12 of transmitter 10 generates M sets of pseudo-random frequencies with their corresponding pseudo-random phases. In a preferred embodiment, orthogonal M-ary symbols are used and therefore frequency assignments are not reused during a timing interval for the M symbols. In other words, M sets of $N_t$ frequencies are drawn pseudo-randomly from N frequency channels without replacement.

After the tone frequencies are generated and their phases are randomized, in a preferred embodiment the frequency domain representation is converted to N time domain samples by an inverse finite Fourier transform $FFT^{-1}$, the time domain signal being thereafter transmitted to receiver 20 from antenna 13 of transmitter 10.

At receiver 20, the N time samples are converted back to N complex tone amplitudes by a direct finite Fourier transform FFT. This requires that the receive sample clock be synchronized with the receive symbol timing. Such synchronization may be achieved by the transmission of a preamble of a known sequence of symbols at the beginning of a transmission and having the receiver monitor and correlate for this known waveform, or other well-known methods of synchronization.

The output of FFT in receiver 20 is a set of N complex amplitudes corresponding to each of the transmitted tones. These complex amplitudes are processed by M symbol correlators 22. As illustrated in the expanded diagram in FIG. 2 of symbol correlator 22 in receiver 20, such processing involves, for each symbol, zeroing the amplitudes of the $N-N_t$ tones not occupied by that symbol and amplitude normalization and phase de-randomization of the occupied tones. The resulting $N_t$ tone amplitudes are then summed coherently and the symbol with the largest magnitude is determined.

The embodiment illustrated in FIG. 1 is referred to as a system with a rectangular window for N samples. It has N frequency channels and N samples per symbol with no modification of the time domain samples in a symbol. The rectangular window has large spectral sidelobes which result in large interference with signals of the same type. Another embodiment of the system reduces these spectral sidelobes with a time domain window applied to each symbol.

Figure 2:
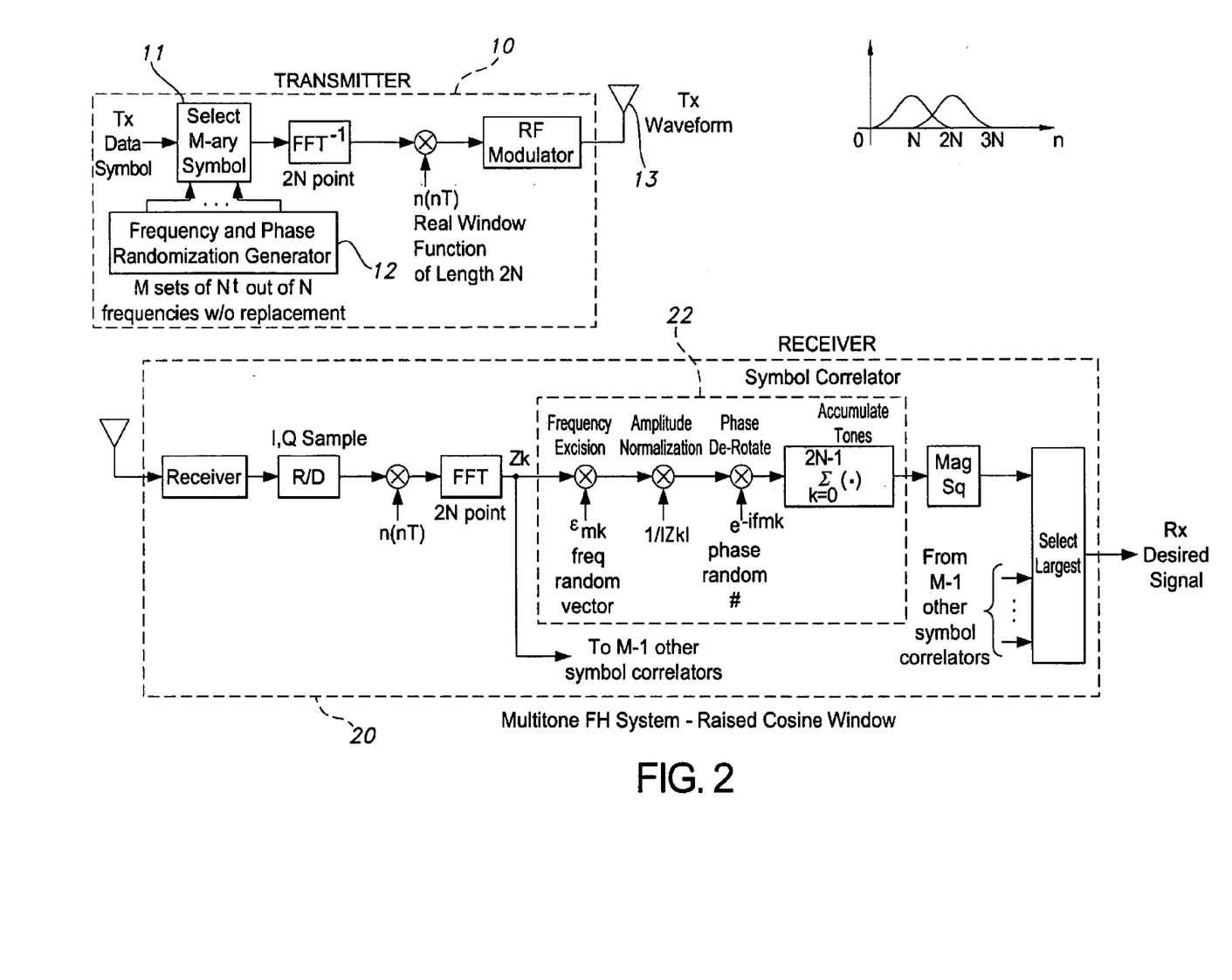
FIG. 2 is a basic block diagram of a communications system using multitone frequency hop, wherein the raised cosine window is utilized in the receiver.

A method of doing this is illustrated in FIG. 2. Symbols of a total duration of 2N samples are used. These are generated by starting with 2N frequency channels instead of the N channels used with the rectangular window embodiment. Again, symbols are generated pseudo-randomly by selecting $N_t$ occupied frequency channels out of the 2N total channels to represent each of the M symbols. Now a 2N point transform $FFT^{-1}$ is used to convert the complex tone amplitudes to 2N time domain samples. These samples are then multiplied by a real window function 14, of length 2N samples. In a preferred embodiment, a raised cosine window function is used.

Symbols are still sent once every N samples so that he symbols overlap in the output waveform. For the rectangular window case, frequency channels are spaced by $$\Delta f = \frac{1}{NT}$$

where T is the sample interval and 1/T is the total system bandwidth. For the embodiment using the raised cosine window, the spacing of the frequency channels is only half as large, so that the total bandwidth is the same.

As illustrated in FIG. 2, frequency excision and amplitude normalization occurs in each symbol correlator 22 in receiver 20. Frequency excision is accomplished by multiplication of the complex tone amplitudes $Z_k$, k=0, 1, ..., 2N−1 output from the 2N point FFT, by a pseudo random vector $\epsilon_{mk}$ where m=0, 1, ..., M−1 and denotes the symbol number. This vector has the value "one" in each location corresponding to an occupied tone for that symbol and the value "zero" otherwise. For each occupied tone, the corresponding $Z_k$ is amplitude normalized to unity and its phase is de-rotated by the pseudo-random angle $\phi_{mk}$. The resulting $N_t$ complex values are summed coherently to form the correlator output.

Amplitude normalization corresponds to hard limiting of each occupied tone. This limits the amount of interference caused by collisions but also tends to emphasize small noise components for unoccupied tones in the symbol correlators different from the correct symbol. For an LPI system, it is intended that the desired signal be transmitted at a level just sufficient for satisfactory reception. In the described embodiment where $N_r=64$, which produces a spread spectrum processing gain of 18 db, the desired signal should be well below the noise level. Thus, amplitude normalization generally operates on strong noise components.

Figure 3:
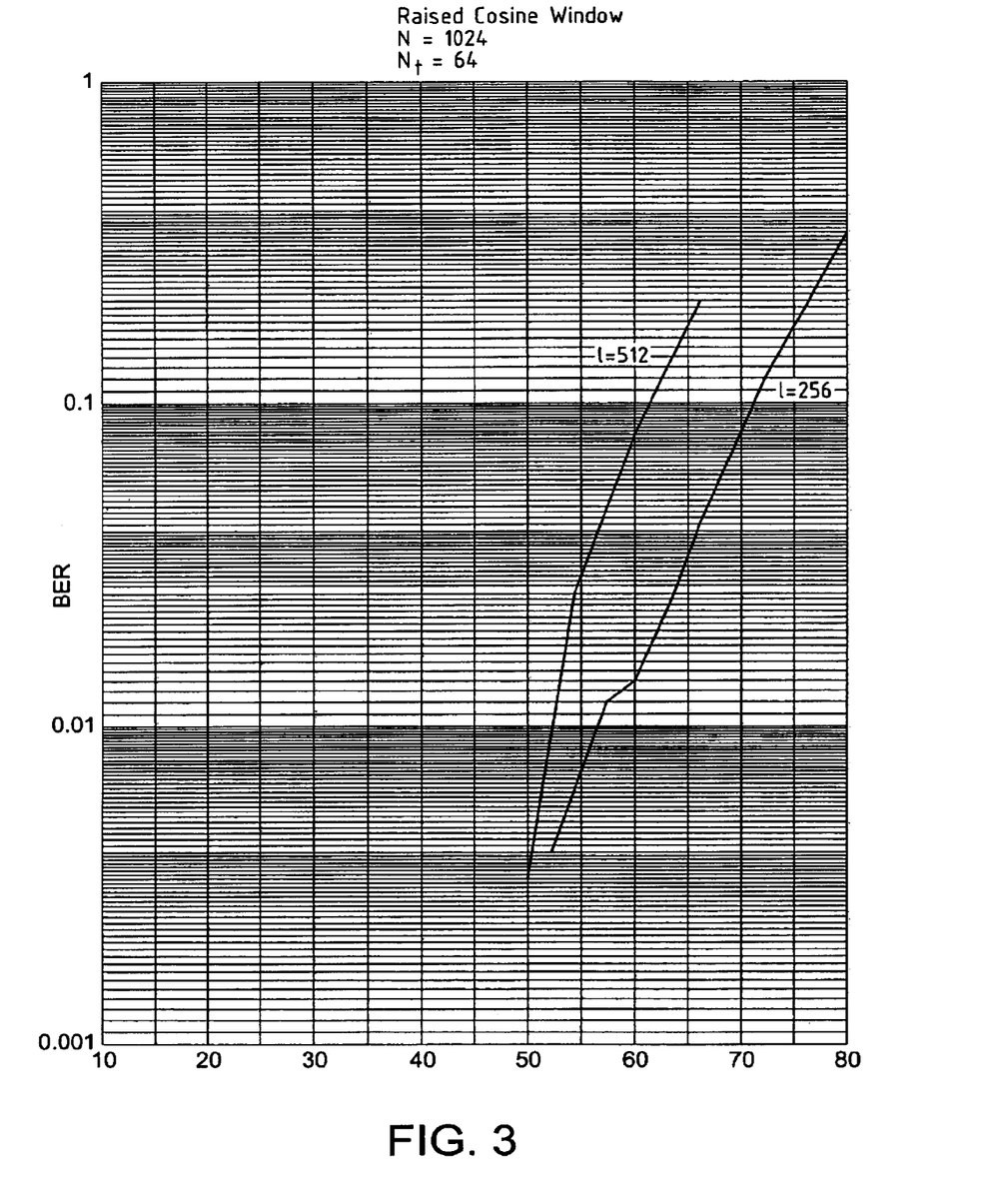
FIG. 3 is a plot of performance of the system using the raised cosine window comparing relative timing offset between a desired and an interfering signal.
Figure 4:
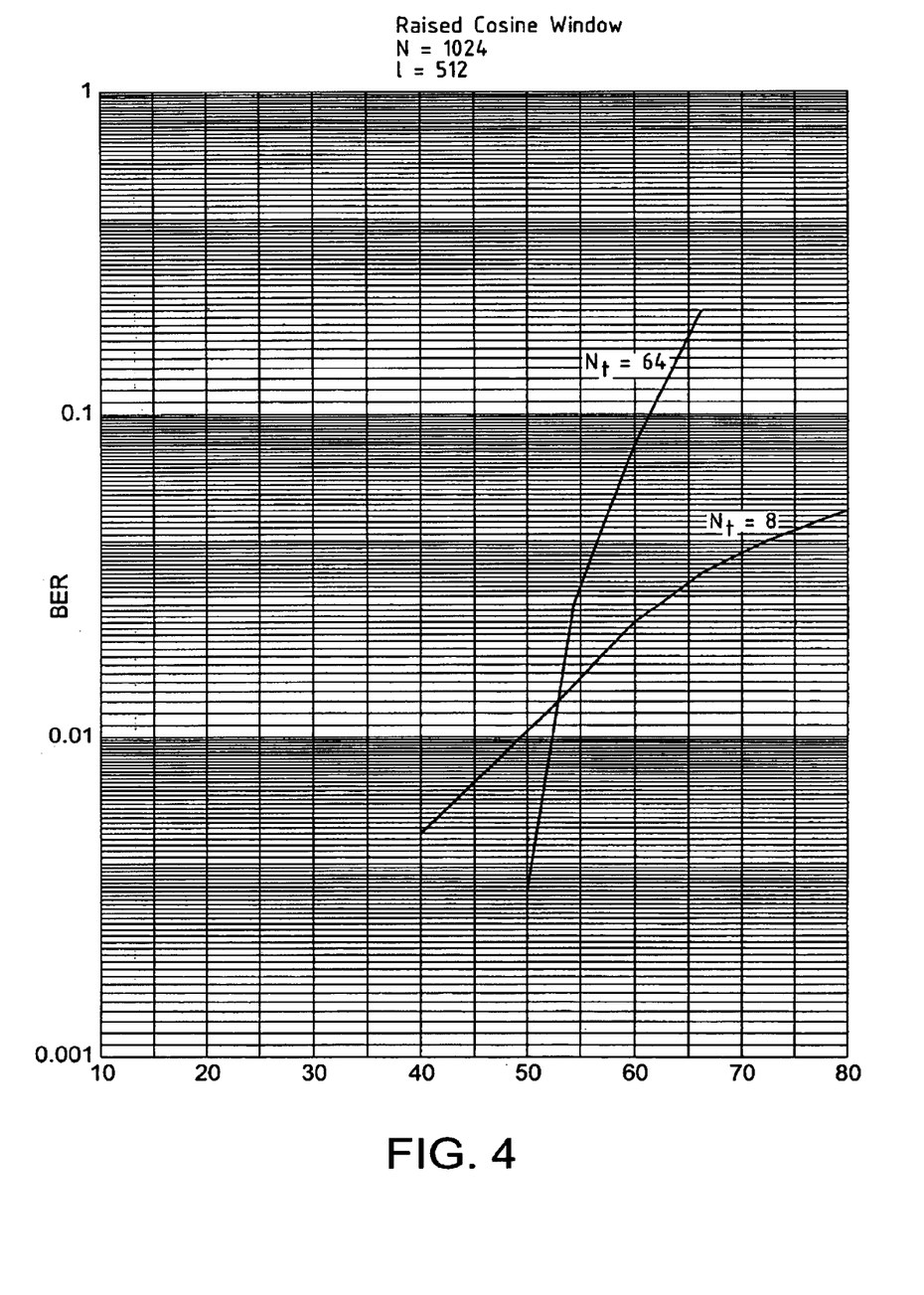
FIG. 4 is a plot of system performance comparing number of tones used to represent a specific information bit.
Figure 5:
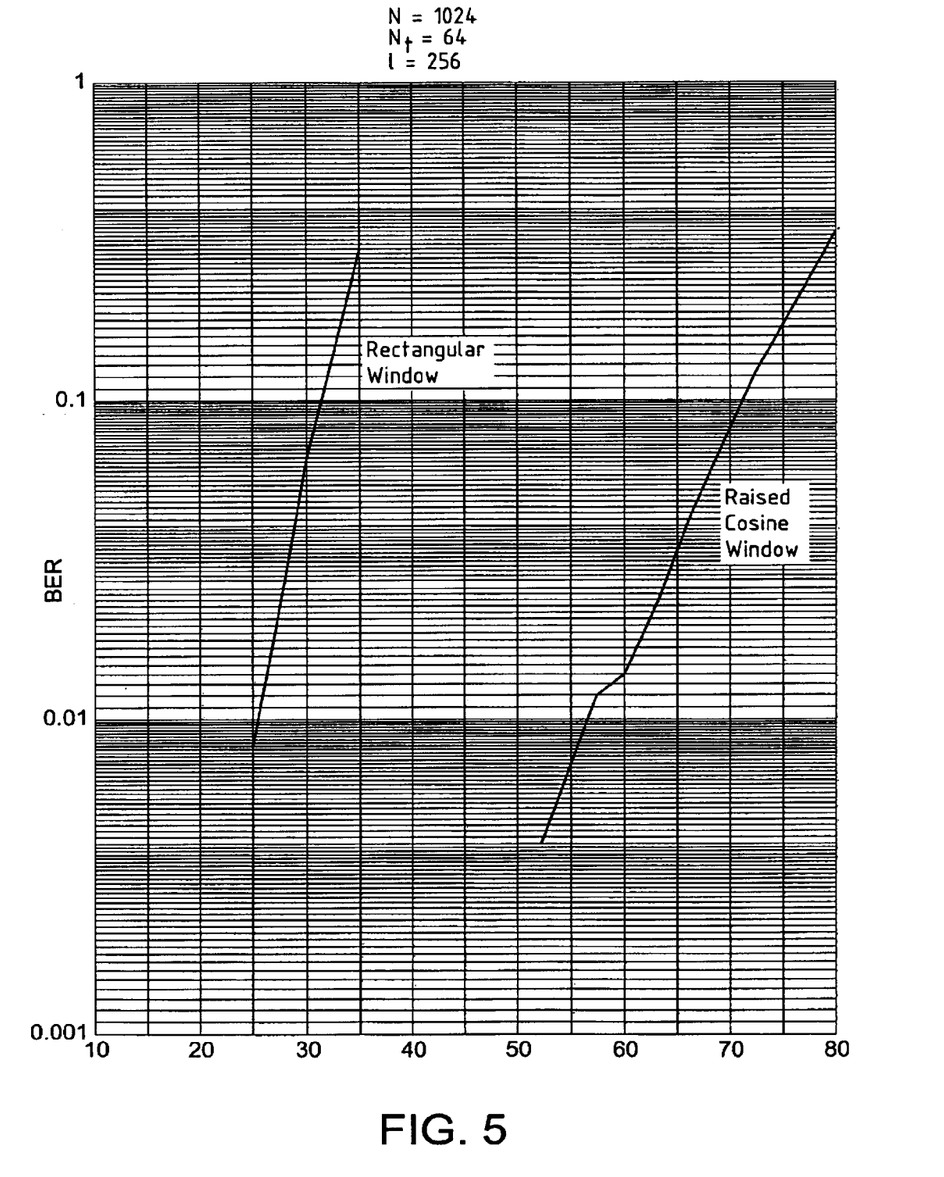
FIG. 5 is a plot of system performance comparing the rectangular window with the raised cosine window.

FIG. 3 illustrates how a change in timing offset l between a desired and an interfering signal (schematically illustrated in FIG. 1A) affects system performance, as measured by bit error rate (BER) plotted against the near/far ratio (NFR), for N fixed at 1024, $N_r$ fixed at 64 and M equal to 4, using a raised cosine window. FIG. 4 illustrates system performance using the raised cosine window for a fixed timing offset l of 512 while $N_r$ is varied. FIG. 5 illustrates the variation in system performance between the rectangular window and the raised cosine window with N, $N_r$ and l held fixed.

Although the present embodiment of the invention has been described in detail, it should be understood that various changes, alterations and substitutions can be made therein without departing from the spirit and scope of the invention as defined by the appended claims.

What is claimed is:

1. In a method of communicating information between at least two points using spread spectrum communications technology wherein said information is digitized and encoded, said encoded information is used to modulate a baseband signal having greater bandwidth than the bandwidth of said information, said baseband signal is in turn used to modulate a carrier signal to be transmitted from a first point, and wherein said transmitted signal is received, demodulated and decoded at a second point so as to replicate the information sent, the improvement wherein:

said information encoding step comprises the substeps of:

establishing a plurality of subsets of tones to represent each possible state of said digitized information during a given timing interval, the tones comprising each said subset being selected from a set of N frequencies;

for selected successive timing intervals, establishing a new plurality of said subsets of tones from said set N, wherein selection of said tones comprising each of said subsets of tones is established based on a known coding sequence; and said baseband modulation step comprises the substep of:

selecting the subset of tones corresponding to an increment of said digitized information to be transmitted during a timing interval.

2. The method of claim 1 wherein said tones of said plurality of subsets of tones have their phasing determined in accordance with a known coding sequence.

3. The method of claim 2 wherein said coding sequence upon which said determination of said phasing of said tones comprising said plurality of subsets of tones is based is a pseudo-random code.

4. The method of claim 1 wherein said baseband modulation step further comprises the substep of causing a frequency domain representation of said corresponding subset of tones to be operated on by an inverse finite Fourier transform thereby producing a time domain representation of said corresponding plurality of tones and said step of demodulating said received signal includes the substep of operating on said received signal by a finite Fourier transform thereby reproducing a frequency domain representation of said corresponding subset of tones.

5. The method of claim 4 wherein said states of said digital information are encoded by a plurality of said subsets of tones chosen from a set of 2N frequencies and the output of said inverse finite Fourier transform is thereafter multiplied by a real window function of length 2N.

6. The method of claim 1 wherein said tones comprising each of said subsets of tones representing each state of said digital information are orthogonal one from another during a given timing interval.

7. The method of claim 1 wherein the step of decoding said received signal includes the substep of processing the received signal by a plurality of signal correlators corresponding to each subset of said plurality of subsets of tones, and wherein, after said processing, the signal correlator having the largest output magnitude is determined to represent the transmitted information.

8. The method of claim 1 wherein said coding sequence upon which said selection of said tones comprising each of said plurality of subsets of tones is based is a pseudo-random code.

9. In a method of communicating information between at least two points using spread spectrum communications technology wherein said information is digitized and encoded, said encoded information is used to modulate a baseband signal having greater bandwidth than the bandwidth of said information, said baseband signal is in turn used to modulate a carrier signal to be transmitted from a first point, and wherein said transmitted signal is received, demodulated and decoded at a second point so as to replicate the information sent, the improvement wherein:

said information encoding step comprises the substeps of:

establishing a plurality of subsets of tones to represent each possible state of said digitized information during a given timing interval, the tones comprising each said subset being selected from a set of N frequencies;

for selected successive timing intervals, establishing new plurality of said subsets of tones from said set N, wherein selection of said tones comprising each of said subsets of tones is established based on a known coding sequence;

said baseband modulation step comprises the substep of selecting the subset of tones corresponding to an increment of said digitized information to be transmitted during a timing interval and causing a frequency domain representation of said corresponding subset of tones to be operated on by an inverse finite Fourier transform thereby producing a time domain representation of said corresponding subset of tones; and said step of demodulating said received signal includes the substep of operating on said received signal by a finite Fourier transform thereby reproducing a frequency domain representation of said corresponding subset of tones.

10. The method of claim 9 wherein said tones comprising said plurality of subsets of tones have their phasing determined in accordance with a known coding sequence.

11. The method of claim 10 wherein said coding sequence upon which said determination of said phasing of said tones comprising said plurality of subsets of tones is based is a pseudo-random code.

12. The method of claim 9 wherein said tones comprising each of said subsets of tones representing each state of said digital information are orthogonal one from another during a given timing interval.

13. The method of claim 9 wherein the step of decoding said received signal includes the substep of processing the received signal by a plurality of signal correlators corresponding to each subset of said plurality of subsets of tones, and wherein, after said processing, the signal correlator having the largest output magnitude is determined to represent the transmitted information.

14. The method of claim 9 wherein said states of said digital information are encoded by a plurality of said subsets of tones chosen from a set of 2N frequencies and the output of said inverse finite Fourier transform is thereafter multiplied by a real window function of length 2N.

15. The method of claim 9 wherein said coding sequence upon which said selection of said tones comprising each of said plurality of subsets of tones is based is a pseudo-random code.

16. In a method of communicating information between at least two points using spread spectrum communications technology wherein said information is digitized and encoded, said encoded information is used to modulate a baseband signal having greater bandwidth than the bandwidth of said information, said baseband signal is in turn used to modulate a carrier signal to be transmitted from a first point, and wherein said transmitted signal is received, demodulated and decoded at a second point so as to replicate the information sent, the improvement wherein:

said information encoding step comprises the substeps of:

defining M-ary symbols to represent each possible state of said digitized information;

assigning subsets of $N_t$ tones out of a set of N available tones to represent each of said M-ary symbols;

for selected successive timing intervals, assigning new subsets of $N_t$ tones, each said $N_t$ subset being drawn from said set N, to represent each of said M-ary symbols, wherein selection of tones comprising each said $N_t$ tones representing said M-ary symbols is established based on a known coding sequence;

said baseband modulation step comprises the substep of:

selecting the symbol representing the information state to be transmitted during a timing interval and causing a frequency domain representation of the $N_t$ tones corresponding to said selected symbol to be operated on by an inverse finite Fourier transform thereby producing a time domain representation of said corresponding $N_t$ tones; and said step of demodulating said received signal includes the substep of operating on said received signal by a finite Fourier transform thereby reproducing a frequency domain representation of said corresponding $N_t$ tones.

17. The method of claim 16 wherein said tones comprising said $N_t$ tones have their phasing determined in accordance with a known coding sequence.

18. The method of claim 17 wherein said coding sequence upon which said determination of said phasing of said tones comprising said $N_t$ tones is based is a pseudo-random code.

19. The method of claim 16 wherein said tones comprising each of said subsets of $N_t$ tones, representing each of said symbols, are orthogonal one from another during a given timing interval.

20. The method of claim 16 wherein said N available tones is equal to the quotient of the bandwidth of said baseband signal divided by the bandwidth of one of said tones comprising said $N_t$ tones.

21. The method of claim 16 wherein said set N available tones is 1024 and said $N_t$ tones representing one of said M-ary symbols is 64.

22. The method of claim 16 wherein said M of said M-ary symbols is 4.

23. The method of claim 16 wherein said step of decoding said received signal includes the substep of processing the received signal by a plurality of signal correlators, each corresponding to a subset of said $N_t$ tones representing one of said symbols, and wherein, after said processing, the signal correlator having the largest output magnitude is determined to represent the transmitted information.

24. The method of claim 16 wherein said symbols are each encoded by a subset of said $N_t$ tones drawn from a set of 2N available tones and the output of said inverse finite Fourier transform is thereafter multiplied by a real window function of length 2N.

25. The method of claim 16 wherein said coding sequence upon which said selection of said tones comprising each of said $N_t$ tones is based is a pseudo-random code.

26. In a spread spectrum communications system comprising at least one transmitting means operative to encode, modulate and transmit digitized information and at least one receiving means operative to receive, demodulate, decode and thereby replicate such digitized information, the improvement comprising:

selection means associated with said transmitting means for defining M-ary symbols to represent each possible state of said digitized information;

generation means associated with said transmitting means for assigning a subset of $N_t$ tones out of a set of N available tones to represent each of said M-ary symbols in selected successive timing intervals, wherein selection of said $N_t$ tones representing each of said M-ary symbols is established based on a known coding sequence;

transforming means associated with said transmitting means for causing a frequency domain representation of the subset $N_t$ tones corresponding to the symbol to be transmitted during a timing interval to be transformed to a time domain representation of said corresponding $N_t$ tones; and reverse transforming means associated with said receiving means to reproduce the frequency domain representation of said corresponding $N_t$ tones.

27. The system of claim 26 wherein said generation means further comprises means for determining the phasing of said tones comprising said $N_t$ tones in accordance with a known coding sequence.

28. The system of claim 26 wherein said generation means further comprises means for assigning said tones comprising said $N_t$ tones, representing each of said M-ary symbols, orthogonally from one symbol to another during a given timing interval.

29. The system of claim 26 wherein said receiving means further includes a plurality of signal correlator means corresponding to each subset of said $N_t$ tones representing each of said symbols, and wherein the signal correlator means having the largest output magnitude is determined to represent the transmitted symbol.

30. The system of claim 26 wherein said generation means operates on a set of 2N available tones and said transmitting means includes a means for multiplying the output of said transforming means by a real window function of length 2N.

31. A receiver for a spread spectrum communications system operative to receive, demodulate, decode and thereby replicate transmitted digital information comprising:

means for establishing a timing reference corresponding to timing information embedded in said transmitted information;

means for establishing a coding sequence corresponding to coding embedded in said transmitted information, wherein said embedded transmitted coding is characterized as having a plurality of subsets of tones established to represent each possible state of said transmitted digital information during a timing interval, the tones comprising each said subset being selected from a set of N frequencies, and further wherein a new plurality of said subsets of tones is established for selected successive timing intervals; and means for decoding one of M symbols corresponding to an increment of digitized information transmitted during a given timing interval.

32. The receiver of claim 31 wherein said decoding means further includes a plurality of signal correlator means corresponding to each of said M symbols, and wherein the signal correlator means having the largest output magnitude is determined to represent the transmitted symbol.

33. A receiver for a spread spectrum communications system operative to receive, demodulate, decode and thereby replicate transmitted information comprising:

means for establishing a timing reference corresponding to timing information embedded in said transmitted information;

means for establishing a coding sequence corresponding to coding embedded in said transmitted information;

means for decoding one of M symbols corresponding to an increment of digitized information transmitted during a given timing interval; and a reverse transforming means to reproduce the frequency domain representation of a transmitted time domain representation of said transmitted symbol;

wherein said decoding means further includes a plurality of signal correlator means corresponding to each of said M symbols, and wherein the signal correlator means having the largest output magnitude is determined to represent the transmitted symbol.

\* \* \* \* \*